United States Patent
Duh et al.

(10) Patent No.: US 6,610,819 B2
(45) Date of Patent: Aug. 26, 2003

(54) REDUCTION OF FRIABILITY OF POLY (TRIMETHYLENE TEREPHTHALATE)

(75) Inventors: Ben Duh, Tallmadge, OH (US); Robert Lawrence Blackbourn, Houston, TX (US); Kathleen Suzanne Kiibler, Katy, TX (US); Cecilia Zuqi Tse, Katy, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/158,606

(22) Filed: May 30, 2002

(65) Prior Publication Data

US 2003/0055204 A1 Mar. 20, 2003

Related U.S. Application Data

(60) Provisional application No. 60/295,273, filed on Jun. 1, 2001.

(51) Int. Cl.$^7$ ................................................ C08F 6/00
(52) U.S. Cl. ................................... 528/499; 528/503
(58) Field of Search ........................... 528/499, 503

(56) References Cited

U.S. PATENT DOCUMENTS

| 4,374,975 | A | 2/1983 | Duh | 528/272 |
|---|---|---|---|---|
| 5,408,035 | A | 4/1995 | Duh | 528/480 |
| 5,540,868 | A | 7/1996 | Stouffer et al. | |
| 5,633,018 | A | 5/1997 | Stouffer et al. | 425/8 |
| 5,730,913 | A | 3/1998 | Stouffer et al. | 264/8 |
| 5,763,104 | A | 6/1998 | Stouffer et al. | |
| 5,990,265 | A | 11/1999 | Blanchard et al. | |
| 6,093,786 | A | 7/2000 | Kelsey | 528/271 |
| 6,277,947 | B1 * | 8/2001 | Kelsey et al. | 528/279 |
| 6,297,315 | B1 * | 10/2001 | Duh et al. | 524/605 |
| 6,326,456 | B2 * | 12/2001 | Kelsey et al. | 528/279 |
| 6,461,575 | B1 * | 10/2002 | Duh et al. | 422/245.1 |

FOREIGN PATENT DOCUMENTS

| EP | 0547553 A1 | 6/1993 |
|---|---|---|
| EP | 1016692 A1 | 7/2000 |
| JP | 8-311177 | 11/1996 |
| WO | 00/64962 | 11/2000 |
| WO | WO 00/68294 | 11/2000 |

* cited by examiner

*Primary Examiner*—Samuel A. Acquah
(74) *Attorney, Agent, or Firm*—Donald F. Haas

(57) ABSTRACT

The friability of crystallized PTT and solid stated PTT can be effectively reduced by lowering the temperature of the quenching water used in the pelletizing of the melt polycondensation polymer to between 32° F. (0° C.) and 65° F. (18° C.). In addition, the robustness of solid stated PTT pellets is effectively increased by using a prepolymer with a lower intrinsic viscosity (IV) or by increasing the IV of the solid stated product.

11 Claims, 5 Drawing Sheets

REDUCTION OF FRIABILITY OF POLY (TRIMETHYLENE TEREPHTHALATE)

This application claims the benefit of provisional application 60/295,273 filed Jun. 1, 2001.

FIELD OF THE INVENTION

Unlike poly(ethylene terephthalate) (PET), poly (trimethylene terephthalate) (PTT) becomes friable after being crystallized and, especially, after being further polymerized in the solid state (SSP). Because of its friability, during conveying and shipping of crystallized or solid stated PTT, which is usually in pellet form, excessive amounts of dust and fines are generated, incurring a substantial material loss and creating problems during subsequent processing. We have discovered three unexpected ways to increase the robustness of crystallized and solid stated PTT pellets, thereby minimizing dust and fines generation problems during handling of such PTT pellets.

BACKGROUND OF THE INVENTION

PTT is a newly commercialized polyester whose properties and processes for manufacture are similar to those of the well-known and most widely used polyester, PET. PTT possesses a unique combination of properties suitable for fiber and engineering plastic applications. For fiber applications, the required intrinsic viscosity (IV) of PTT is between 0.80 and 0.94 dl/g (equivalent to number average molecular weights of 18,000 and 20,000 respectively). This is approximately the same number average molecular weight range for PET used in textile fiber applications. PTT for fiber applications can be advantageously produced by a combination of a melt polymerization process and a solid state polymerization (SSP) process because of the reasons given below.

Because PTT is substantially less stable than PET and hence more susceptible to thermal degradation than PET in melt state, the melt polycondensation of PTT should be conducted at temperatures at least 30° C. below that for PET. Furthermore, because the major polycondensation by-product of PTT, 1,3-propanediol (PDO), is substantially less volatile than that of PET, ethylene glycol (EG), a thin-film type polycondensation reactor, such as a disk-ring reactor, should be used to effectively remove the polycondensation by-products to achieve the IV required for fiber-grade PTT. Consequently, a polycondensation time several times longer than for PET and a disk-ring type polycondensation reactor several times larger than for PET should be used for PTT. It is a very expensive process if a melt polymerization process alone is used to produce PTT for fiber applications. Furthermore, even at such lower melt polycondensation temperatures, the long residence time required to achieve the desired IV will result in inferior product properties, especially color. By terminating melt polycondensation earlier, to limit thermal degradation, and further polymerizing the melt polycondensation product in solid state at a much lower temperature to the IV suitable for the desired application, better overall process economics and superior product quality, especially in terms of color, can be achieved.

When the desired IV is reached, the melt polycondensation product is usually extruded through a strand die to produce melt strands, which are quenched with water (quenching water) to solidify them, which are then chopped into pellets with a pelletizer. The PTT pellets thus obtained may be used directly for fiber spinning, if the IV is sufficiently high, or otherwise used as a prepolymer for further polymerization in solid state.

In the pelletizing system for polyesters, including PET and PTT, deionized water (DI water) or soft water is used as the quenching water to protect the equipment, especially the cutter. The spent DI water, which is warm, is recycled after being cooled in a heat exchanger usually with utility water, which, in turn, is usually cooled in a cooling tower. Therefore, the temperature of the quenching water is usually somewhat higher than room temperature (i.e., 77° F. or 25° C.). It is not unusual that the quenching water temperature gets as high as 104° F. (40° C.) during the summer time.

Because of the relatively low Tg (about 45° C.) and relatively high crystallization rate, PTT pellets thus obtained have a crystallinity of between 10 and 20 wt. % (vs. 3–5 wt. % for PET pellets). Nevertheless, for convenience, the PTT pellets thus obtained are referred to as "amorphous" pellets.

Crystallization of the pelletized amorphous PTT is required for the following reasons:

1. To prevent blocking of amorphous pellets during shipping or storage in summer months.
2. To prevent sticking or agglomeration of pellets during drying prior to spinning.
3. To prevent sticking of pellets during solid state polymerization.

In the summer months, the interior temperature of a rail car or an exposed storage silo can reach as high as 140° F. (60° C.), exceeding the Tg of PTT. Under these shipping and storage conditions, amorphous PTT pellets become tacky and stick together to form blocks. To prevent blocking of PTT pellets during shipping or storage in the summer months, PTT pellets must be crystallized to achieve a crystallinity of at least 36%. Crystallization of PTT can be most efficiently conducted at temperatures between 140 and 170° C. Because sticking of pellets occurs before the pellets develop a sufficient crystallinity, crystallization is usually conducted under vigorous agitation in a mechanically agitated vessel, a tumble vessel, or a fluidized bed. The typical crystallization time is between 10 minutes and one hour, depending on the type of crystallizer used.

To minimize hydrolytic degradation of PTT during melt processing, such as spinning, PTT must be dried to a moisture content below 0.005% beforehand, usually also at temperatures between 140 and 170° C. To prevent sticking during drying, amorphous PTT pellets must be precrystallized, usually at the same temperature used for drying. Once PTT pellets are sufficiently crystallized, they can be dried in a moving bed or a drying hopper without sticking. Therefore crystallization and drying of PTT can be conducted in the same vessel or in two different vessels. Although, in large-scale operations, crystallization and drying of PTT are most economically conducted in separate vessels, at many fiber-spinning facilities, tumble dryers are used to crystallize and dry polyesters.

SSP of PTT is effected at 190° C. or higher temperatures. To prevent PTT pellets from sticking together or to the reactor wall, amorphous PTT prepolymer must be crystallized at an early stage of the SSP process.

We have found that PTT pellets produced by conventional process, unlike PET pellets, become brittle or friable after undergoing crystallization or SSP. Because of the friability of the pellets, excessive amounts of dust and fines can be generated during shipping and conveying of crystallized or solid stated PTT products, incurring a substantial material loss and creating problems in the downstream operations. The most pronounced dust and fines generation occurs in high-speed pneumatic conveying systems, such as a dilute phase conveying system. Material losses as high as 15% through dust and fines generation during conveying of solid stated PTT have been reported.

SUMMARY OF THE INVENTION

We have unexpectedly discovered that the friability of crystallized PTT and solid stated PTT can be effectively reduced by lowering the temperature of the quenching water used in the pelletizing of the melt polycondensation polymer to between 32° F. (0° C.) and 65° F. (18° C.). In addition, we also discovered that the robustness of solid stated PTT pellets is effectively increased by using a prepolymer with a lower IV or by increasing the IV of the solid stated product. The normal range for prepolymer IV is 0.60 to 0.70 dl/g. In this invention, it should be 0.35 to 0.70 dl/g. The normal range for SSP IV is 0.80 to 0.94 dl/g. For this invention, it should be 0.80 to 2.00 dl/g.

DETAILED DESCRIPTION OF THE INVENTION

Quenching the SSP product in water rather than cooled air has distinct advantages. Polymer cooled in water is less friable than polymer cooled in cold air. Water can remove fines stuck on the pellet surfaces better than air and a cleaner product is the result. Water cooling systems are more compact and cheaper than air cooling systems. Pollution control is much easier with a water cooling system.

Density and Crystallinity

The density of PTT pellets was measured in a density gradient column.

The crystallinity of PTT pellets can be determined either by the DSC method or by the density method. It should be noted that the crystallinity values determined by the two methods might be quite different because each method employs different sets of assumptions. Because the density method is quicker and simpler and yields more consistent results, it was used exclusively to determine crystallinity. All the PTT resins used in the experiments were delustered PTT resins containing 0.4% by weight of titanium dioxide ($TiO_2$) delustrant. The polymer density was calculated from the sample (pellet) density using the density value of 3.90 g/cm$^3$ for $TiO_2$. The weight percent crystallinity of the polymer, $X_c$, is related to the polymer density by following equation:

$$X_c = \frac{D_c}{D} \frac{(D - D_a)}{(D_c - D_a)} \times 100\%$$

where D is polymer density, $D_c$ (=1.42 g/cm$^3$) and $D_a$ (=1.29 g/cm$^3$) are densities of 100% crystalline PTT and truly amorphous PTT (with 0% crystallinity) respectively.

Friability Test

We have developed a simple test method to determine the relative friability or robustness of PTT pellets. The apparatus consists of two flat metal plates. The test pellet is laid on its side between the two plates. Then a fixed force is applied to the top plate in an attempt to crush the pellet. With crystallized or solid stated pellets, four possible outcomes are observed. The pellet may remain intact, crack, break into a few pieces, or shatter into many small pieces. With amorphous pellets, another outcome in addition to these four is possible, i.e., the pellet may be flattened with or without cracks at the edge, but not broken. We used a fixed force of 105 lb$_f$ (467 Newtons) for all the friability tests and tested 20 pellets for each sample. For the sake of simplicity, pellets that remained intact, were flattened, or were cracked in the test were considered to pass the test, and those that were broken or shattered were considered to fail the test. Thus a failure rate in terms of percent of pellets that fail was obtained for each sample. This is reasonable because as long as the pellets are not broken off or rubbed off in the conveying lines or the shipping vessels, no material loss is incurred or no harm is done. The failure rate is a useful measure for the friability or robustness of polyester pellets. The higher the failure rate, the more friable or the less robust are the pellets. It should be noted that, to have a fair comparison, all test pellets should have similar size and shape, because a bigger pellet, for example, will have a greater mass to dissipate the fixed force applied and is less likely to fail than a smaller pellet, all else being equal.

Pelletization

PTT resins produced in a production-scale melt polycondensation plant were extruded and pelletized with a small extruder and a small pelletizer for the experiments. There were two reasons for the pelletization: (1) to prepare pellets with similar size and shape, and (2) to test effects of quenching water temperature on the friability of crystallized and solid stated PTT. The shapes of polymer pellets produced by two different pelletizing systems may be quite different and may yield quite different friability test results even if they have similar friability. Furthermore, it is very difficult, if not impossible, to change the temperature of the quenching water in the pelletizing system of a polyester resin production plant. Therefore, to determine the effect of pelletizing quenching water temperature on the friability of crystallized or solid stated PTT pellets, it is necessary to use an experimental pelletizing system to produce the PTT pellets of similar size and shape for testing.

The pelletizing system used to prepare PTT pellets for the experiments consisted of a 1¼" (3.2 cm) extruder (Model KL-125 manufactured by Killion Extruders, Inc., Cedar Grove, N.J.) fitted with an strand die having a 3/16" (0.48 cm) diameter hole, a 8" W×6" D×8' L (20.3 cm W×15.2 cm D×243.8 cm L) quenching water trough, and a lab pelletizer (Model PELL 4 manufactured by Berlyn Corp., Worcester, Mass.). The resin to be pelletized was dried in a vacuum oven at 140° C. overnight prior to pelletizing. During pelletizing, the extruder barrel temperature and the die temperature were set at 265° C. and the water trough was filled with quenching water with the desired temperature, which ranged from 32° F. (0° C.) to 105° F. (40.6° C.). The quenching water with each desired temperature was prepared by mixing tap water with ice or hot water. For example, quenching water with 32° F. of temperature was prepared by mixing ample amounts of crushed ice with cold tap water. The pre-dried PTT resin was extruded through the single-hole die to form a melt strand, which was quenched in the water trough to solidify, and then was chopped into pellets in the pelletizer. The pellet size was controlled by adjusting the screw RPM of the extruder and/or the cutter RPM of the pelletizer. The pellet size was controlled to within the range of 2.42–2.56 g/100. The resulting pellets had a cylindrical shape, with a typical length of 3.3 mm, a typical major diameter of 3.1 mm, and a typical minor diameter of 2.2 mm. Within this range, the effect of the pellet size on the friability test result is negligible. For each pelletization run, the amount of polymer pelletized was limited to no more than 1.5 pounds (0.68 kg) so that the quenching water temperature rose by no more than 2° F. (1° C.) during the run.

Solid State Polymerization Experiments

All SSP experiments were conducted in a small-scale reactor made of a 24-inch (61 cm) long glass tube with about 1.25-inch (3.2 cm) inner diameter. This tube-shaped SSP reactor had a cone-shaped bottom, which was connected to a small purge-gas supply tube, which in turn coiled up around the reactor. The only purge gas used was nitrogen. The reactor with its purge-gas supply tube was immersed in a thermostated oil bath that heated the incoming nitrogen as well as the reactor content.

Initially, the oil temperature was controlled at 170° C. About 100 grams of PTT pellets was charged into the reactor and a stream of nitrogen, sufficient to fluidize the PTT pellets in the reactor, was passed through the reactor to effect crystallization of the PTT pellets. After the crystallization step, which lasted 15 minutes, the nitrogen flow was reduced to 18 standard cubic feet per hour (SCFH) (509.7 liters per hour) to maintain a static bed and the oil temperature was maintained at 170° C. for another hour to dry the PTT pellets. Then the oil temperature was raised quickly to the desired SSP temperature, which ranged from 190 to 225° C., and the nitrogen flow was again increased to fluidize the PTT pellets for 15 minutes, during which the PTT pellets were preheated to the SSP temperature. After the preheating step, the nitrogen flow was again reduced to 18 SCFH (509.7 liters per hour) to maintain a static bed to start the SSP step. Except for the 190° C. SSP runs, the SSP step of each run lasted 22 hours. For the 190° C. SSP runs the SSP step lasted longer. Samples were taken at various intervals throughout the SSP step.

EXAMPLE 1

An amorphous PET sample with an IV of 0.593 dl/g and a pellet size of 2.46 g/100 and a solid stated PET sample with an IV of 0.842 dl/g and a pellet size of 0.250 g/100 were subjected to the friability test. All the amorphous PET pellets tested were slightly flattened and all the solid stated PET pellets tested remained intact, indicating that neither the amorphous PET pellets nor the solid stated PET pellets were friable.

EXAMPLE 2

A sample of amorphous delustered PTT (containing 0.4 wt. % $TiO_2$) with an IV of 0.635 dl/g and a pellet size of 2.45 g/100 (referred to as Polymer A) produced in a batch melt polymerization plant was subjected to the friability test. The average quenching water temperature used in pelletizing this PTT resin was 78° F. (25.6° C.). All pellets tested were somewhat flattened, but not cracked or broken. This indicates that, with a sufficiently high IV, amorphous PTT pellets are ductile and not friable.

EXAMPLE 3

A sample of solid stated delustered PTT with an IV of 0.887 dl/g (referred to as Polymer B) produced in a commercial solid state polymerization plant, with the amorphous PTT in Example 2 as the prepolymer, was subjected to the friability test. The PTT pellets had been solid stated in a continuous SSP reactor at temperatures between 192 and 198° C. for about 10 hours. All pellets tested were shattered, indicating this solid stated PTT sample was very friable.

EXAMPLE 4

Polymer A in Example 2 was pelletized using quenching water temperatures of 78° F. (25.6° C.), 52° F. (11.1° C.), and 32° F. (0° C.). After the pelletization, the IV of Polymer A changed very little. The IV's, pellet sizes, densities, and crystallinities (by density) of the pelletized polymers obtained are listed in the following table:

TABLE 1

| Designation of Pelletized Polymer | Feed Polymer Used | Quenching Water Temp ° F. (° C.) | IV (dl/g) | Pellet Size (g/100) | Polymer Density (g/cm3) | Crystallinity by Density (wt. %) |
|---|---|---|---|---|---|---|
| Polymer A-78 | Polymer A | 78 (25.6) | 0.632 | 2.48 | 1.3062 | 13.6 |
| Polymer A-52 | Polymer A | 52 (11.1) | 0.633 | 2.51 | 1.3036 | 13.4 |
| Polymer A-32 | Polymer A | 32 (0) | 0.636 | 2.54 | 1.3058 | 13.2 |

The density and crystallinity of the pelletized polymer increased slightly with increasing quenching water temperature. This is because the quenching rate of the PTT melt strand is slower with warmer quenching water, allowing the polymer to crystallize to a greater extent before it is cooled to below its Tg.

Each of the 3 pelletized polymers was crystallized and dried at 170° C. for 4 hours in a small-scale SSP reactor as described in the procedure for the SSP experiments. About 50 grams of polymer was used in each crystallization/drying run. During the first 15 minutes, a high enough nitrogen flow was used to fluidize the polymer bed. Then the nitrogen flow was reduced to 18 SCFH (509.7 liters per hour) to maintain a static bed for the remaining portion of the run. Samples were taken 0.25, 0.5, 1, and 2 hours after the beginning of each run and at the end of each run. The IV of each polymer did not change significantly during the run. Note that crystallization and drying (for melt processing) of PTT requires 15 to 30 minutes and about 4 hours respectively.

The samples taken during the crystallization/drying runs as well as the amorphous pelletized polymers (0-hour samples) were subjected to the friability test. The results are shown in the following table:

TABLE 2

Percent Failure Rates of Friability Tests for Crystallized/Dried Samples of Pelletized PTT

| Polymer | Crystallization/Drying Time | | | | | |
|---|---|---|---|---|---|---|
| | 0 hour | 0.25 hour | 0.5 hour | 1 hours | 2 hours | 4 hours |
| Polymer A-78 | 0 | 100 | 100 | 100 | 100 | 100 |
| Polymer A-52 | 0 | 65 | 75 | 80 | 85 | 85 |
| Polymer A-32 | 0 | 35 | 50 | 60 | 70 | 75 |

All the amorphous pellets of the pelletized polymers were somewhat flattened without being broken after the tests. However, all the polymers were embrittled to various extents after being crystallized and dried for various periods of time. The longer the crystallization/drying time (or the higher the crystallinity), the more brittle the polymers became. It can also be seen that the degrees of embrittlement were higher with the lower molecular weight polymers. The above observations are in agreement with the classic polymer crystallization theory. What is not expected is the fact that the friability of the crystallized/dried PTT after a fixed time of crystallization/drying decreased with decreasing quenching water temperature used in pelletizing the polymer. This cannot be explained by, and, in fact, is contrary to the conventional polymer crystallization theory.

Since the PTT melt strands cool very rapidly during pelletizing, practically all the crystallization of PTT takes place near its Tg (about 45° C.). Crystallization of polymers involves two consecutive processes: the formation of nuclei and their subsequent growth. Because lower temperatures favor nucleation while higher temperatures favor spherulitic growth, crystallization of PTT during pelletizing produces large numbers of nuclei and tiny crystallites and a small difference in crystallinity can mean a great difference in numbers of nuclei and tiny crystallites formed. This is supported by the fact that clear PTT (PTT that does not contain $TiO_2$) pelletized in a conventional pelletizing system remains transparent even though it may have about 15% crystallinity because the crystallites are small enough not to scatter visible light. During crystallization at 170° C., the temperature of the polymer is raised rapidly and the existing nuclei and tiny crystallites grow into spherulites with very few new nuclei being created. Therefore, a greater number of smaller spherulites will be formed in a pelletized polymer with a higher existing crystallinity, i.e., one pelletized with warmer quenching water. The classic polymer crystallization theory predicts the brittleness of crystallized polymer increases with increasing spherulite size as well as crystallinity, contrary to the friability test results in the table above.

Thus we have unexpectedly discovered that the friability of crystallized PTT pellets can be reduced or the robustness of crystallized PTT pellets can be increased by decreasing the temperature of the quenching water used to pelletize the polymer from the melt polymerization reactor. The use of colder quenching water improves the quenching rate of the melt strands, thereby lowering the polymer temperature to below its Tg in a shorter time. One way to decrease the quenching water temperature is by adding a lower temperature heat exchanger downstream of the normal heat exchanger used in the conventional pelletizing system to cool the recycled quenching water. The coolant for the lower temperature heat exchanger (referred to as brine, an aqueous solution of glycol or salt) can be supplied by a chiller. By using such an additional lower temperature heat exchanger, it is possible to cool the recycled quenching water to below room temperature (i.e., about 77° F. or 25° C.). Of course, the quenching rate of the melt strands can be further increased by increasing the flow rate of the quenching water.

EXAMPLE 5

A delustered PTT resin with an IV of 0.653 dl/g (referred to as Polymer C) produced in a batch polymerization plant was pelletized using quenching water temperatures of 100, 74, 53, and 32° F. (37.8, 23.3, 11.7, and 0° C.) to prepare prepolymers for SSP experiments. The IV's, pellet sizes, polymer densities, and crystallinities of the pelletized polymers obtained are listed in the following table:

TABLE 3

| Designation of Pelletized Prepolymer | Feed Polymer Used | Quenching Water Temp. ° F. (° C.) | IV (dl/g) | Pellet Size (g/100) | Polymer Density (g/cm3) | Crystallinity by Density (wt. %) |
|---|---|---|---|---|---|---|
| Prepolymer C-100 | Polymer C | 100 (37.8) | 0.656 | 2.49 | 1.3066 | 13.86 |
| Prepolymer C-74 | Polymer C | 74 (23.3) | 0.655 | 2.42 | 1.3064 | 13.73 |
| Prepolymer C-53 | Polymer C | 53 (11.7) | 0.652 | 2.46 | 1.3061 | 13.45 |
| Prepolymer C-32 | Polymer C | 32 (0) | 0.653 | 2.44 | 1.3059 | 13.32 |

The IV changes during the pelletizations were insignificant. The density and crystallinity of the pelletized prepolymer increased slightly with increasing quenching water temperature.

The pelletized polymers thus obtained were solid state polymerized at 210° C. for 22 hours. Samples were taken at various intervals during each of the SSP runs. These samples were tested for IV and density. From the density data, the crystallinities were calculated for all the samples. Additionally, all of these samples were subjected to the friability test to compare their relative friabilities. The test results are listed in Table I.

TABLE I

Experimental Results for Example 5

| Prepolymer Used | SSP Time (hours) | IV (dl/g) | Friability Test Failure Rate (%) | Polymer Density (g/cm³) | Crystallinity (wt. %) |
|---|---|---|---|---|---|
| Prepolymer C-32 | 0 | 0.670 | 95 | 1.3578 | 54.5 |
| | 1 | 0.752 | 95 | 1.3593 | 55.7 |
| | 2 | 0.812 | 50 | 1.3598 | 56.1 |
| | 3.5 | 0.897 | 45 | 1.3604 | 56.5 |
| | 5 | 0.975 | 20 | 1.3607 | 56.8 |

TABLE I-continued

Experimental Results for Example 5

| Prepolymer Used | SSP Time (hours) | IV (dl/g) | Friability Test Failure Rate (%) | Polymer Density (g/cm$^3$) | Crystallinity (wt. %) |
|---|---|---|---|---|---|
| | 7 | 1.034 | 5 | 1.3613 | 57.2 |
| | 10 | 1.110 | 0 | 1.3622 | 57.9 |
| | 14 | 1.200 | 0 | 1.3629 | 58.4 |
| | 18 | 1.295 | 0 | 1.3630 | 58.5 |
| | 22 | 1.339 | 0 | 1.3633 | 58.7 |
| Prepolymer C-53 | 0 | 0.665 | 100 | 1.3581 | 54.7 |
| | 1 | 0.750 | 95 | 1.3599 | 56.2 |
| | 2 | 0.821 | 70 | 1.3606 | 56.6 |
| | 3.5 | 0.892 | 60 | 1.3609 | 56.9 |
| | 5 | 0.968 | 40 | 1.3609 | 56.9 |
| | 7 | 1.054 | 20 | 1.3618 | 57.6 |
| | 10 | 1.156 | 0 | 1.3624 | 58.0 |
| | 14 | 1.243 | 0 | 1.3630 | 58.5 |
| | 18 | 1.298 | 0 | 1.3633 | 58.7 |
| | 22 | 1.336 | 0 | 1.3633 | 58.7 |
| Prepolymer C-74 | 0 | 0.665 | 100 | 1.3573 | 54.2 |
| | 1 | 0.742 | 100 | 1.3592 | 55.6 |
| | 2 | 0.815 | 95 | 1.3595 | 55.8 |
| | 3.5 | 0.886 | 90 | 1.3606 | 56.6 |
| | 5 | 0.950 | 85 | 1.3606 | 56.6 |
| | 7 | 1.030 | 75 | 1.3609 | 56.9 |
| | 10 | 1.132 | 75 | 1.3618 | 57.6 |
| | 14 | 1.211 | 70 | 1.3627 | 58.3 |
| | 18 | 1.275 | 70 | 1.3633 | 58.7 |
| | 22 | 1.331 | 60 | 1.3633 | 58.7 |
| Prepolymer C-100 | 0 | 0.636 | 100 | 1.3568 | 53.8 |
| | 1 | 0.714 | 100 | 1.3590 | 55.5 |
| | 2 | 0.781 | 100 | 1.3595 | 55.8 |
| | 3.5 | 0.854 | 100 | 1.3602 | 56.4 |
| | 5 | 0.962 | 95 | 1.3609 | 56.9 |
| | 7 | 1.029 | 90 | 1.3612 | 57.1 |
| | 10 | 1.114 | 95 | 1.3618 | 57.6 |
| | 14 | 1.200 | 90 | 1.3621 | 57.8 |
| | 18 | 1.269 | 85 | 1.3624 | 58.0 |
| | 22 | 1.311 | 75 | 1.3627 | 58.3 |

It can be seen in Table I that each prepolymer was very friable (with 100% or 95% friability test failure rate) at the beginning of the SSP step (after the crystallization/drying step) and gradually became less friable as the SSP time was increased. The results in Table I also indicate that the IV's and the crystallinities of the four prepolymers increased with increasing SSP time as expected, but the quench water temperature had little effects on the IV and the crystallinity after each period of SSP. Since the crystallinity increased with increasing SSP time and the conventional polymer crystallization theory predicts that polymer becomes more brittle as the crystallinity is increased, this observation is contrary to the conventional polymer crystallization theory. We believe that the reduction in the pellet friability by SSP is a result of the increase in the molecular weight. During the course of SSP, most of the polymer chain ends are forced out of the crystallites into the amorphous regions between the crystallites, as a result of continued perfection of the crystalline structure. The reactions between these chain ends form tie-molecules between crystallites, thereby strengthening the polymer.

Figure 1:
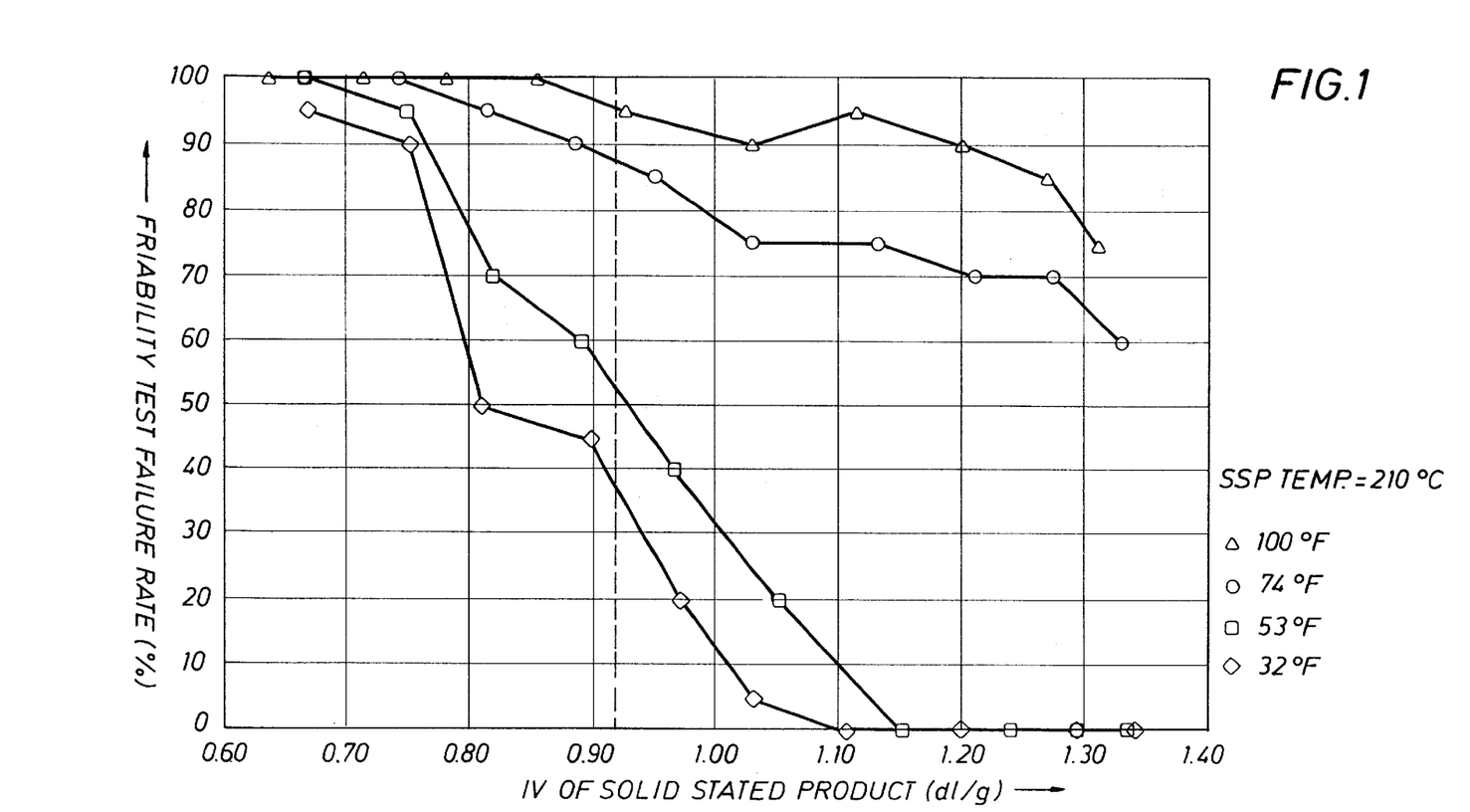
FIG. 1 shows the effects of prepolymer pelletizing quenching water temperature on friability test failure rates of solid stated products of 0.653 IV PTT prepolymer.

Since the increase in the robustness of the PTT pellets is mainly due to the increase in the IV, the failure rates are plotted against the IV in FIG. 1 for each of these prepolymers, which were pelletized with various quenching water temperatures. It is obvious from this figure that the friability of the solid stated product of each fixed IV decreases with decreasing quenching water temperature used to pelletize the prepolymer. This is also contrary to the conventional theory of polymer crystallization, which predicts that the friability of a crystalline polymer increases with increasing spherulite size. Since a prepolymer pelletized with a lower quenching water temperature will have a smaller number of nuclei or tiny crystallites, and since the quenching water temperature does not significantly affect the crystallinity of the solid stated product with a fixed IV, the spherulites formed within the solid stated product of this prepolymer will be larger. We theorize that as the average size of the spherulites is increased, the perfection of the crystalline structure becomes more advanced and more chain ends will be concentrated in the amorphous regions just outside the spherulites. Furthermore, as the spherulites grow larger, the boundaries of the adjacent spherulites get closer. As a result, more tie-molecules will be formed between spherulites to strengthen the polymer structure.

This example demonstrates that the friability of solid stated PTT can be effectively reduced by lowering the temperature of the quenching water used in the pelletizing of the prepolymer.

EXAMPLE 6

Prepolymer C-53 prepared in Example 5 was solid state polymerized in a small SSP reactor at 190, 200, 210, and 220° C. The samples taken during these four SSP runs were characterized for IV, density, and crystallinity and subjected to the friability test. Table II lists the test results.

TABLE II

Experimental Results for Example 6

| SSP Temperature (° C.) | SSP Time (hours) | IV (dl/g) | Friability Test failure Rate (%) | Polymer Density (g/cm$^3$) | Crystallinity (wt. %) |
|---|---|---|---|---|---|
| 190 | 0 | 0.650 | 100 | 1.3499 | 48.5 |
| | 1 | 0.662 | 100 | 1.3519 | 50.0 |
| | 2 | 0.692 | 100 | 1.3530 | 50.9 |
| | 3.5 | 0.718 | 100 | 1.3536 | 51.4 |
| | 5 | 0.755 | 90 | 1.3541 | 51.7 |
| | 7 | 0.786 | 85 | 1.3546 | 52.1 |
| | 10 | 0.833 | 85 | 1.3551 | 52.5 |
| | 14 | 0.892 | 70 | 1.3554 | 52.7 |
| | 18 | 0.922 | 65 | 1.3556 | 52.8 |
| | 22 | 0.971 | 60 | 1.3557 | 52.9 |
| | 30 | 1.022 | 55 | 1.3560 | 53.2 |
| 200 | 0 | 0.653 | 100 | 1.3541 | 51.7 |
| | 1 | 0.699 | 95 | 1.3562 | 53.3 |
| | 2 | 0.740 | 90 | 1.3567 | 53.7 |
| | 3.5 | 0.790 | 80 | 1.3573 | 54.2 |
| | 5 | 0.841 | 75 | 1.3576 | 54.4 |
| | 7 | 0.895 | 65 | 1.3579 | 54.6 |
| | 10 | 0.957 | 45 | 1.3587 | 55.2 |
| | 14 | 1.026 | 40 | 1.3593 | 55.7 |
| | 18 | 1.109 | 30 | 1.3596 | 55.9 |
| | 22 | 1.129 | 20 | 1.3599 | 56.2 |
| 210 | 0 | 0.665 | 100 | 1.3581 | 54.7 |
| | 1 | 0.750 | 95 | 1.3599 | 56.2 |
| | 2 | 0.805 | 70 | 1.3606 | 56.6 |
| | 3.5 | 0.892 | 60 | 1.3609 | 56.9 |
| | 5 | 0.968 | 40 | 1.3609 | 56.9 |
| | 7 | 1.054 | 20 | 1.3618 | 57.6 |
| | 10 | 1.156 | 0 | 1.3623 | 58.0 |
| | 14 | 1.243 | 0 | 1.3630 | 58.5 |
| | 18 | 1.295 | 0 | 1.3633 | 58.7 |
| | 22 | 1.336 | 0 | 1.3633 | 58.7 |

TABLE II-continued

Experimental Results for Example 6

| SSP Temperature (° C.) | SSP Time (hours) | IV (dl/g) | Friability Test failure Rate (%) | Polymer Density (g/cm³) | Crystallinity (wt. %) |
|---|---|---|---|---|---|
| 220 | 0 | 0.661 | 95 | 1.3593 | 55.7 |
|  | 1 | 0.812 | 50 | 1.3624 | 58.0 |
|  | 2 | 0.912 | 40 | 1.3625 | 58.2 |
|  | 3 | 1.022 | 5 | 1.3627 | 58.3 |
|  | 5 | 1.126 | 0 | 1.3629 | 58.4 |
|  | 7 | 1.206 | 0 | 1.3630 | 58.5 |
|  | 10 | 1.325 | 0 | 1.3635 | 58.9 |
|  | 14 | 1.429 | 0 | 1.3636 | 59.0 |
|  | 18 | 1.523 | 0 | 1.3639 | 59.2 |
|  | 22 | 1.560 | 0 | 1.3642 | 59.4 |

Figure 2:
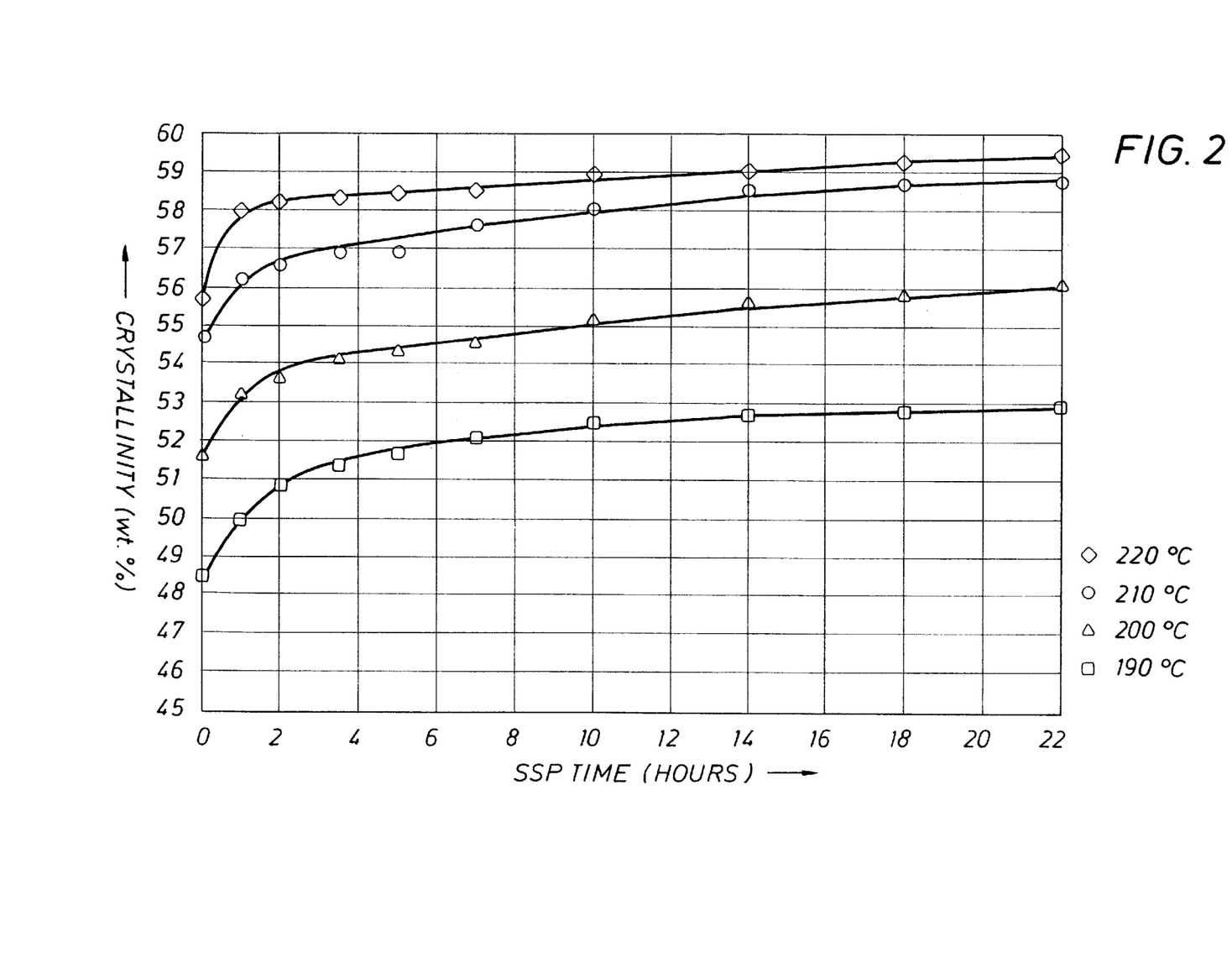
FIG. 2 is a plot of the crystallinity versus SSP time for a prepolymer solid stated at different temperatures.

The crystallinity data in Table II are plotted against the SSP time in FIG. 2. This figure indicates that the crystallinity after each period of SSP time increases with increasing SSP temperature. Furthermore, because higher temperatures favor spherulitic growth, the spherulite size of the solid stated polymer should also increase with increasing SSP temperature.

Figure 3:
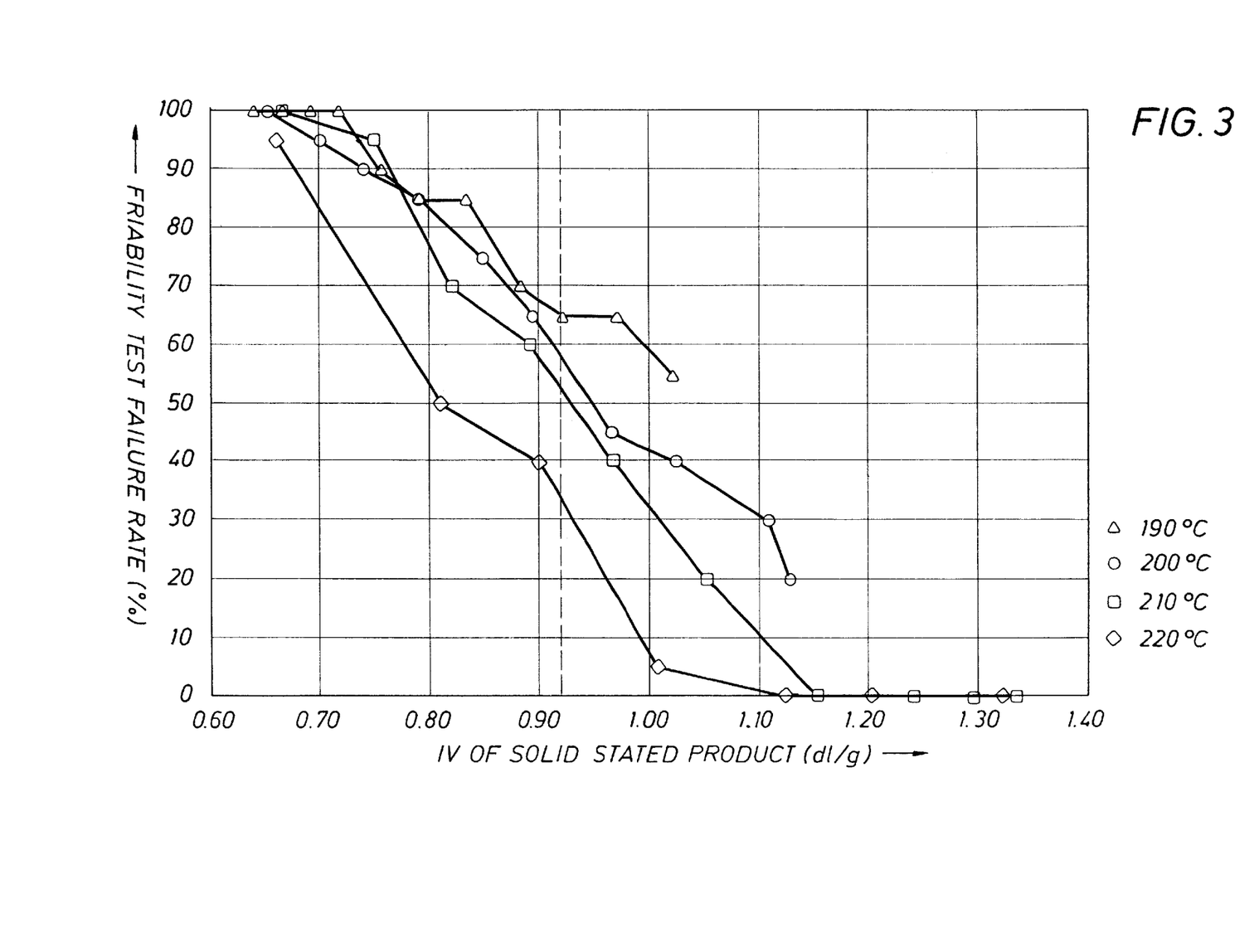
FIG. 3 shows the effect of SSP temperature on the friability test failure rate of SSP product of 0.653 IV PTT prepolymer.

The friability test failure rate data in Table II are plotted against the IV in FIG. 3. It can be seen that the friability of the solid stated product with a fixed IV decreases with increasing SSP temperature. Since solid stated products prepared at higher temperatures have higher crystallinities with larger spherulites, this observation is also opposite to the conventional polymer crystallization theory, which asserts that the brittleness of a crystalline polymer increases with increasing crystallinity and spherulite size. Thus increasing SSP temperature is another unexpected method that can effectively increase the robustness of solid stated PTT pellets.

EXAMPLE 7

A delustered PTT resin with an IV of 0.545 dl/g (referred to as Polymer D) produced in a batch polymerization plant was pelletized with various quenching water temperatures. The IV's, pellet sizes, polymer densities, and crystallinities of these pelletized prepolymers are listed in Table 4.

TABLE 4

| Designation of Pelletized Prepolymer | Feed Polymer Used | Quenching Water Temp. ° F. (° C.) | IV (dl/g) | Pellet Size (g/100) | Polymer Density (g/cm3) | Crystallinity by Density (wt. %) |
|---|---|---|---|---|---|---|
| Prepolymer D-105 | Polymer D | 105 (40.6) | 0.546 | 2.46 | 1.3077 | 14.83 |
| Prepolymer D-76 | Polymer D | 76 (24.4) | 0.545 | 2.45 | 1.3074 | 14.56 |
| Prepolymer D-68 | Polymer D | 68 (20) | 0.543 | 2.47 | 1.3073 | 14.43 |
| Prepolymer D-52 | Polymer D | 52 (11.1) | 0.546 | 2.50 | 1.3072 | 14.35 |
| Prepolymer D-32 | Polymer D | 32 (0) | 0.545 | 2.47 | 1.3069 | 14.16 |

Figure 4:
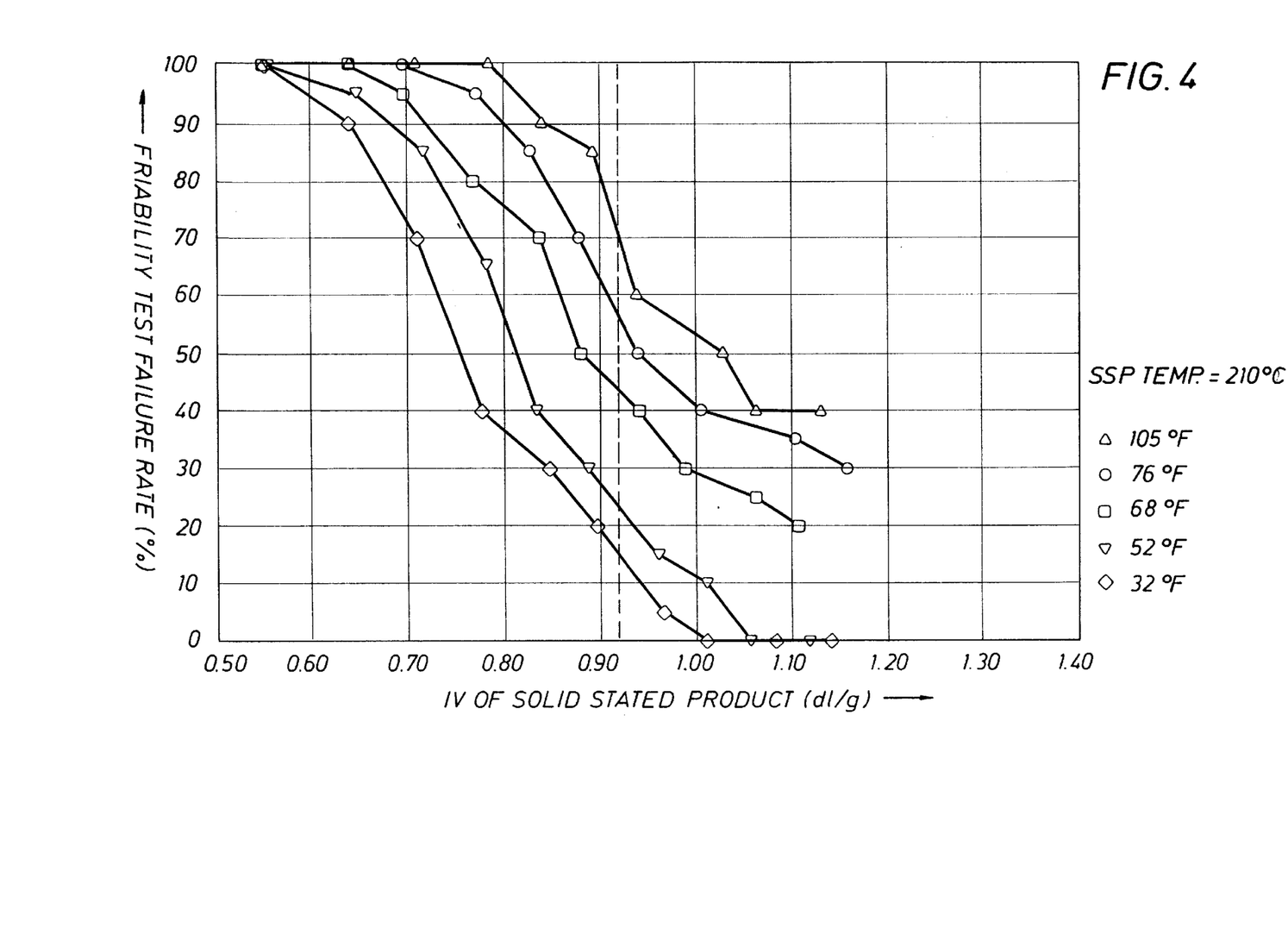
FIG. 4 shows the effects of prepolymer pelletizing quenching water temperature on the friability test failure rates of SSP products of 0.545 IV PTT prepolymer.

All of these pelletized prepolymers were solid state polymerized at 210° C. The samples taken during the SSP runs were characterized for IV, density, and crystallinity. Furthermore, these samples were subjected to the friability test. The test results are listed in Table III. The friability test failure rates are plotted against the IV for these SSP runs in FIG. 4. This figure also shows that the friability of the solid stated product of 0.545 dl/g IV PTT prepolymer decreases pronouncedly with decreasing quenching water temperature used in the pelletizing of the prepolymer.

TABLE III

Experimental Results for Example 7

| Prepolymer Used | SSP Time (hours) | IV (dl/g) | Friability Test Failure Rate (%) | Polymer Density (g/cm³) | Crystallinity (wt. %) |
|---|---|---|---|---|---|
| Prepolymer D-32 | 0 | 0.550 | 100 | 1.3583 | 54.9 |
|  | 1 | 0.639 | 90 | 1.3612 | 57.1 |
|  | 2 | 0.710 | 70 | 1.3618 | 57.6 |
|  | 3.5 | 0.777 | 40 | 1.3626 | 58.2 |
|  | 5 | 0.847 | 30 | 1.3626 | 58.2 |
|  | 7 | 0.896 | 20 | 1.3631 | 58.6 |
|  | 10 | 0.967 | 5 | 1.3641 | 59.3 |
|  | 14 | 1.011 | 0 | 1.3648 | 59.9 |
|  | 18 | 1.083 | 0 | 1.3654 | 60.3 |
|  | 22 | 1.142 | 0 | 1.3658 | 60.6 |
| Prepolymer D-52 | 0 | 0.548 | 100 | 1.3585 | 55.1 |
|  | 1 | 0.646 | 95 | 1.3614 | 57.3 |
|  | 2 | 0.716 | 85 | 1.3627 | 58.0 |
|  | 3.5 | 0.782 | 65 | 1.3628 | 58.3 |
|  | 5 | 0.834 | 40 | 1.3632 | 58.7 |
|  | 7 | 0.887 | 30 | 1.3634 | 58.8 |
|  | 10 | 0.961 | 15 | 1.3645 | 59.6 |
|  | 14 | 1.012 | 10 | 1.3649 | 60.0 |
|  | 18 | 1.058 | 0 | 1.3652 | 60.2 |
|  | 22 | 1.120 | 0 | 1.3654 | 60.3 |
| Prepolymer D-68 | 0 | 0.552 | 100 | 1.3573 | 54.2 |
|  | 1 | 0.639 | 100 | 1.3606 | 56.7 |
|  | 2 | 0.695 | 95 | 1.3614 | 57.3 |
|  | 3.5 | 0.768 | 80 | 1.3618 | 57.6 |
|  | 5 | 0.837 | 70 | 1.3622 | 57.9 |
|  | 7 | 0.879 | 50 | 1.3629 | 58.5 |
|  | 10 | 0.941 | 40 | 1.3641 | 59.3 |
|  | 14 | 0.988 | 30 | 1.3645 | 59.6 |
|  | 18 | 1.063 | 25 | 1.3648 | 59.9 |
|  | 22 | 1.109 | 20 | 1.3654 | 60.3 |
| Prepolymer D-76 | 0 | 0.548 | 100 | 1.3579 | 54.6 |
|  | 1 | 0.638 | 100 | 1.3608 | 56.9 |
|  | 2 | 0.694 | 100 | 1.3612 | 57.1 |
|  | 3.5 | 0.770 | 95 | 1.3622 | 57.9 |
|  | 5 | 0.827 | 85 | 1.3622 | 57.9 |
|  | 7 | 0.877 | 70 | 1.3626 | 58.2 |
|  | 10 | 0.939 | 50 | 1.3637 | 59.0 |
|  | 14 | 1.005 | 40 | 1.3647 | 59.7 |
|  | 18 | 1.103 | 35 | 1.3656 | 60.5 |
|  | 22 | 1.157 | 30 | 1.3661 | 60.8 |
| prepolymer D-105 | 0 | 0.546 | 100 | 1.3583 | 54.9 |
|  | 1 | 0.639 | 100 | 1.3612 | 57.1 |
|  | 2 | 0.708 | 100 | 1.3618 | 57.6 |
|  | 3.5 | 0.783 | 100 | 1.3626 | 58.2 |
|  | 5 | 0.839 | 90 | 1.3626 | 58.2 |
|  | 7 | 0.892 | 85 | 1.3631 | 58.6 |

TABLE III-continued

Experimental Results for Example 7

| Prepolymer Used | SSP Time (hours) | IV (dl/g) | Friability Test Failure Rate (%) | Polymer Density (g/cm$^3$) | Crystallinity (wt. %) |
|---|---|---|---|---|---|
| | 10 | 0.938 | 60 | 1.3641 | 59.3 |
| | 14 | 1.028 | 50 | 1.3648 | 59.9 |
| | 18 | 1.062 | 40 | 1.3654 | 60.3 |
| | 22 | 1.130 | 40 | 1.3658 | 60.6 |

EXAMPLE 8

Figure 5:
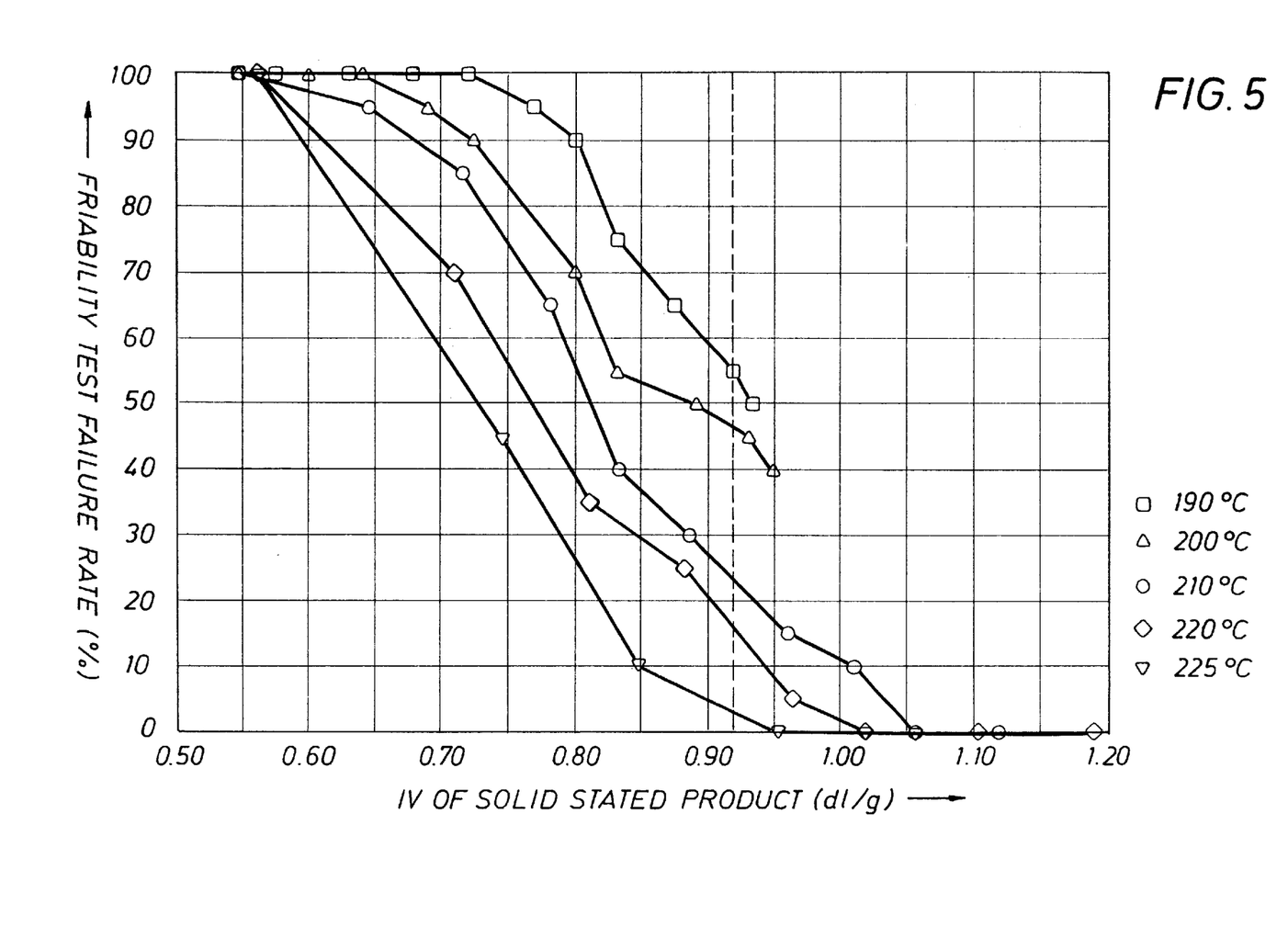
FIG. 5 shows the effect of SSP temperature on the friability test failure rate of SSP product of 0.545 IV PTT prepolymer.

Prepolymer D-52 prepared in Example 7 was solid state polymerized at 190, 200, 210, 220, and 225° C. in a small-scale lab SSP reactor. The samples taken during these SSP runs were characterized for IV and density and subjected to the friability test. The test results are shown in Table IV. The friability test failure rates are plotted against the IV for these SSP runs in FIG. 5. It can be seen in this figure that the friability of the solid stated product of 0.545 dl/g IV prepolymer also decreases pronouncedly with increasing SSP temperature.

TABLE IV

Experimental Results for Example 8

| SSP Temperature (° C.) | SSP Time (hours) | IV (dl/g) | Friability Test failure Rate (%) | Polymer Density (g/cm$^3$) | Crystallinity (wt. %) |
|---|---|---|---|---|---|
| 190 | 0 | 0.547 | 100 | 1.3519 | 50.0 |
| | 2 | 0.576 | 100 | 1.3545 | 52.0 |
| | 5 | 0.635 | 100 | 1.3552 | 52.5 |
| | 8 | 0.673 | 100 | 1.3565 | 53.5 |
| | 11 | 0.720 | 100 | 1.3572 | 54.1 |
| | 15 | 0.769 | 95 | 1.3574 | 54.2 |
| | 19 | 0.809 | 90 | 1.3581 | 54.8 |
| | 25 | 0.832 | 75 | 1.3588 | 55.3 |
| | 32 | 0.875 | 65 | 1.3592 | 55.6 |
| | 39 | 0.920 | 55 | 1.3598 | 56.0 |
| | 46 | 0.935 | 50 | 1.3601 | 56.3 |
| 200 | 0 | 0.547 | 100 | 1.3563 | 53.4 |
| | 1 | 0.600 | 100 | 1.3582 | 54.9 |
| | 2 | 0.640 | 100 | 1.3589 | 55.4 |
| | 3.5 | 0.690 | 95 | 1.3592 | 55.6 |
| | 5 | 0.724 | 90 | 1.3597 | 56.0 |
| | 7 | 0.801 | 70 | 1.3603 | 56.5 |
| | 10 | 0.832 | 55 | 1.3610 | 57.0 |
| | 14 | 0.891 | 50 | 1.3621 | 57.8 |
| | 18 | 0.931 | 45 | 1.3624 | 58.0 |
| | 22 | 0.948 | 40 | 1.3628 | 58.3 |
| 210 | 0 | 0.548 | 100 | 1.3585 | 55.1 |
| | 1 | 0.646 | 95 | 1.3614 | 57.3 |
| | 2 | 0.716 | 85 | 1.3624 | 58.0 |
| | 3.5 | 0.782 | 65 | 1.3628 | 58.3 |
| | 5 | 0.834 | 40 | 1.3632 | 58.7 |
| | 7 | 0.887 | 30 | 1.3634 | 58.8 |
| | 10 | 0.961 | 15 | 1.3645 | 59.6 |
| | 14 | 1.012 | 10 | 1.3649 | 60.0 |
| | 18 | 1.058 | 0 | 1.3652 | 60.2 |
| | 22 | 1.120 | 0 | 1.3654 | 60.3 |
| 220 | 0 | 0.563 | 100 | 1.3608 | 56.9 |
| | 1 | 0.710 | 70 | 1.3626 | 58.2 |
| | 2 | 0.812 | 35 | 1.3635 | 58.9 |
| | 3.5 | 0.884 | 25 | 1.3643 | 59.5 |
| | 5 | 0.966 | 5 | 1.3646 | 59.7 |
| | 7 | 1.022 | 0 | 1.3647 | 59.8 |
| | 10 | 1.106 | 0 | 1.3654 | 60.3 |
| | 14 | 1.194 | 0 | 1.3654 | 60.3 |
| | 18 | 1.254 | 0 | 1.3656 | 60.5 |
| | 22 | 1.333 | 0 | 1.3658 | 60.6 |
| 225 | 0 | 0.563 | 100 | 1.3618 | 57.6 |
| | 1 | 0.746 | 45 | 1.3639 | 59.2 |
| | 2 | 0.849 | 10 | 1.3645 | 59.6 |
| | 3.5 | 0.955 | 0 | 1.3649 | 60.0 |
| | 5 | 1.018 | 0 | 1.3652 | 60.2 |
| | 7 | 1.057 | 0 | 1.3654 | 60.3 |
| | 10 | 1.214 | 0 | 1.3656 | 60.5 |
| | 14 | 1.284 | 0 | 1.3658 | 60.6 |
| | 18 | 1.389 | 0 | 1.3661 | 60.8 |
| | 22 | 1.514 | 0 | 1.3661 | 60.8 |

Since the SSP in commercial production is terminated when the desired product IV is reached, we are most interested in the friability at the product IV. The friability test failure rates for solid stated products at various IV's prepared with various prepolymers at various SSP temperatures can be estimated from FIGS. 1, 3, 4, and 5. Thus, the friability test failure rates of solid stated products with IV's of 0.88 and 0.92 dl/g prepared with various prepolymers at various SSP temperatures are compared in Table 5.

TABLE 5

| Prepolymer | | Quenching | | Product IV = 0.88 dl/g | | Product IV = 0.92 dl/g | |
|---|---|---|---|---|---|---|---|
| ID | Nominal IV (dl/g) | water temp. ° F. (° C.) | SSP temp. (° C.) | ΔIV (dl/g) | Friability test Failure rate (%) | ΔIV (dl/g) | Failure rate (%) |
| C-32 | 0.653 | 32 (0) | 210 | 0.227 | 46 | 0.267 | 38 |
| C-53 | | 53 (11.7) | | | 62 | | 53 |
| C-74 | | 74 (23.3) | | | 90 | | 87 |
| C-100 | | 100 (37.8) | | | 98 | | 95 |
| C-53 | 0.653 | 53 (11.7) | 190 | 0.227 | 70 | 0.267 | 65 |
| | | | 200 | | 68 | | 58 |
| | | | 210 | | 62 | | 53 |
| | | | 220 | | 43 | | 35 |
| D-32 | 0.545 | 32 (0) | 210 | 0.335 | 23 | 0.375 | 15 |
| D-52 | | 52 (11.1) | | | 32 | | 23 |
| D-68 | | 68 (20) | | | 50 | | 43 |

TABLE 5-continued

| | Prepolymer | Quenching | | Product IV = 0.88 dl/g | | Product IV = 0.92 dl/g | |
|---|---|---|---|---|---|---|---|
| | Nominal | water | SSP | | Friability test | | Friability test |
| ID | IV (dl/g) | temp. °F. (°C.) | temp. (°C.) | ΔIV (dl/g) | Failure rate (%) | ΔIV (dl/g) | Failure rate (%) |
| D-76 | | 76 (24.4) | | | 70 | | 56 |
| D-105 | | 105 (40.6) | | | 87 | | 70 |
| D-52 | 0.545 | 52 (11.1) | 190 | 0.335 | 64 | 0.375 | 55 |
| | | | 200 | | 51 | | 47 |
| | | | 210 | | 32 | | 23 |
| | | | 220 | | 26 | | 16 |
| | | | 225 | | 7 | | 3 |

It can be seen in this table that, in addition to the prepolymer pelletizing quenching water temperature and the SSP temperature, the required IV lift in the SSP (ΔIV) also has a significant effect on the friability of the solid stated product. The greater the IV lift, the lower the friability of the solid stated product. Thus we have discovered yet another way to reduce the friability of solid stated PTT, i.e., by increasing the IV lift in the SSP. Preferably, the required IV lift can be increased by using a prepolymer with a lower IV. Alternately, the IV lift can be increased by increasing the product IV, provided a higher product IV is suitable for the intended application.

We claim:

1. In a method for producing polytrimethylene terephthalate which comprises polycondensation of 1,3-propane diol and dimethylterephthalate or terephthalic acid followed by solid state polymerization of the polycondensation reaction product to increase the intrinsic viscosity, the improvement which comprises quenching the polycondensation reaction product in water at a temperature of from 0 to 18° C. followed by pelletization of the quenched product.

2. The process of claim 1 wherein the polycondensation is carried out such that the polycondensation reaction product has an intrinsic viscosity of from 0.35 to 0.70 dl/g.

3. The process of claim 1 wherein the solid state polymerization is carried out such that the solid state polymerization product has an intrinsic viscosity of from 0.80 to 2 dl/g.

4. In a method for producing polytrimethylene terephthalate which comprises polycondensation of 1,3-propane diol and dimethylterephthalate or terephthalic acid followed by solid state polymerization of the polycondensation reaction product to increase the intrinsic viscosity, the improvement which comprises carrying out the polycondensation such that the polycondensation product has an intrinsic viscosity of from 0.35 to 0.70 dl/g.

5. The process of claim 4 wherein the polycondensation reaction product is quenched in water at a temperature of from 0 to 18° C.

6. The process of claim 4 wherein the solid state polymerization is carried out such that the solid state polymerization product has an intrinsic viscosity of from 0.80 to 2 dl/g.

7. In a method for producing polytrimethylene terephthalate which comprises polycondensation of 1,3-propane diol and dimethylterephthalate or terephthalic acid followed by solid state polymerization of the polycondensation reaction product to increase the intrinsic viscosity, the improvement which comprises carrying out the solid state polymerization such that the solid state polymerization product has an intrinsic viscosity of from 0.80 to 2 dl/g.

8. The process of claim 7 wherein the polycondensation is carried out such that the polycondensation reaction product has an intrinsic viscosity of from 0.35 to 0.70 dl/g.

9. The process of claim 7 wherein the polycondensation reaction product is quenched in water at a temperature of from 0 to 18° C.

10. In a method for producing polytrimethylene terephthalate which comprises polycondensation of 1,3-propane diol and dimethylterephthalate or terephthalic acid followed by solid state polymerization of the polycondensation reaction product to increase the intrinsic viscosity, the improvement which comprises carrying out the polycondensation such that the polycondensation reaction product has an intrinsic viscosity of from 0.35 to 0.70 dl/g, carrying out the solid state polymerization such that the solid state polymerization product has an intrinsic viscosity of from 0.80 to 2 dl/g, and quenching the polycondensation reaction product in water at a temperature of from 0 to 18° C. followed by pelletization of the quenched product.

11. In a method for producing polytrimethylene terephthalate which comprises polycondensation of 1,3-propane diol and dimethylterephthalate or terephthalic acid followed by solid state polymerization of the polycondensation reaction product to increase the intrinsic viscosity wherein the difference between the intrinsic viscosity of the solid state polymerization product and intrinsic viscosity of the polycondensation reaction product is X dl/g, the improvement which comprises either:

a) carrying out the polycondensation such that the intrinsic viscosity of the polycondensation reaction product is lowered such that the difference between the intrinsic viscosity of the solid state polymerization product and intrinsic viscosity of the polycondensation reaction product is at least X+0.04 d/lg; and/or b) carrying out the solid state polymerization such that the intrinsic viscosity of the solid state polymerization product is increased such that the difference between the intrinsic viscosity of the solid state polymerization product and the intrinsic viscosity of the polycondensation reaction product is at least X+0.04 dl/g.

* * * * *